United States Patent
Wang et al.

(10) Patent No.: US 11,117,572 B2
(45) Date of Patent: Sep. 14, 2021

(54) COGNITION ENABLED DRIVING PATTERN DETECTION

(71) Applicant: International Business Machines Corporation, Armonk, NY (US)

(72) Inventors: Bing Xin Wang, Beijing (CN); Zhuo J P Cai, Beijing (CN); Kushal Patel, Pune (IN); Sarvesh Patel, Pune (IN)

(73) Assignee: International Business Machines Corporation, Armonk, NY (US)

( * ) Notice: Subject to any disclaimer, the term of this patent is extended or adjusted under 35 U.S.C. 154(b) by 247 days.

(21) Appl. No.: 16/115,749

(22) Filed: Aug. 29, 2018

(65) Prior Publication Data

US 2020/0070821 A1  Mar. 5, 2020

(51) Int. Cl.
| | |
|---|---|
| *B60W 30/095* | (2012.01) |
| *B60W 40/09* | (2012.01) |
| *B60W 50/14* | (2020.01) |
| *G08G 1/0967* | (2006.01) |
| *G07C 5/00* | (2006.01) |

(52) U.S. Cl.
CPC ........ *B60W 30/0953* (2013.01); *B60W 40/09* (2013.01); *B60W 50/14* (2013.01); *G07C 5/008* (2013.01); *G08G 1/0967* (2013.01); *B60W 2050/143* (2013.01); *B60W 2050/146* (2013.01)

(58) Field of Classification Search
CPC .................................................. B60W 30/0953
USPC ........................................................ 701/301
See application file for complete search history.

(56) References Cited

U.S. PATENT DOCUMENTS

| | | | |
|---|---|---|---|
| 8,954,226 B1 * | 2/2015 | Binion ................... | G07C 5/008 |
| | | | 701/33.4 |
| 9,135,803 B1 * | 9/2015 | Fields ..................... | G08B 21/06 |
| 9,511,767 B1 | 12/2016 | Okumura et al. | |
| 9,582,669 B1 * | 2/2017 | Shen ........................ | G06F 21/64 |
| 9,587,952 B1 * | 3/2017 | Slusar ................ | G01C 21/3492 |
| 9,988,055 B1 * | 6/2018 | O'Flaherty ............ | G08B 21/02 |
| 10,475,127 B1 * | 11/2019 | Potter .................... | B60R 25/102 |
| 10,486,708 B1 * | 11/2019 | Chan .................. | G06K 9/00825 |

(Continued)

FOREIGN PATENT DOCUMENTS

| | | |
|---|---|---|
| CN | 104768130 A | 1/2015 |
| CN | 105835870 A | 3/2016 |

(Continued)

OTHER PUBLICATIONS

International Search Report and Written Opinion, International App No. PCT/IB2019/057233, dated Dec. 20, 2019, 9 pages.

(Continued)

*Primary Examiner* — Jean Paul Cass
(74) *Attorney, Agent, or Firm* — Schmeiser, Olsen & Watts, LLP; Nicholas L. Cadmus

(57) ABSTRACT

A method, and associated computer system and computer program product, for cognition enabled driving pattern detection that includes receiving driving related data, storing the driving related data in one or more data repositories, receiving real-time driving data from at least one sensor related to an active driving situation, analyzing the driving related data and the real-time driving data, detecting a predictive driving outcome prior to the occurrence of the predictive driving outcome based on the analyzing, and notifying a driver based on the predictive driving outcome.

17 Claims, 9 Drawing Sheets

(56) References Cited

U.S. PATENT DOCUMENTS

| | | | |
|---|---|---|---|
| 10,818,113 B1* | 10/2020 | Nepomuceno | B60Q 9/008 |
| 2008/0167820 A1 | 7/2008 | Oguchi et al. | |
| 2013/0238365 A1* | 9/2013 | Nepomuceno | G09B 9/04 |
| | | | 705/4 |
| 2013/0279392 A1 | 10/2013 | Rubin et al. | |
| 2014/0195213 A1 | 7/2014 | Kozloski et al. | |
| 2014/0236414 A1 | 8/2014 | Droz et al. | |
| 2015/0254955 A1* | 9/2015 | Fields | G08B 21/02 |
| | | | 705/4 |
| 2016/0096531 A1* | 4/2016 | Hoye | B60W 50/14 |
| | | | 701/23 |
| 2016/0176408 A1* | 6/2016 | Lynch | B60W 40/068 |
| | | | 701/23 |
| 2018/0012093 A1 | 1/2018 | Micks et al. | |
| 2018/0165838 A1* | 6/2018 | Ganesh | G08G 1/16 |
| 2019/0096243 A1* | 3/2019 | Doig | G08G 1/091 |
| 2019/0176837 A1* | 6/2019 | Williams | B60W 50/02 |
| 2019/0367019 A1* | 12/2019 | Yan | G05D 1/027 |
| 2019/0367020 A1* | 12/2019 | Yan | G06K 9/6297 |

FOREIGN PATENT DOCUMENTS

| | | |
|---|---|---|
| CN | 106530834 A | 12/2016 |
| CN | 106740463 A | 12/2016 |
| CN | 108200552 A | 12/2017 |

OTHER PUBLICATIONS

Geng et al., A Scenario-Adaptive Driving Behavior Prediction Approach to Urban Autonomous Driving, Source: Appl. Sci. 2017, 7, 426; doi: 10.3390/app7040426, Retrieved from Internet: URL: http://www.mdpi.com/2076-3417/7/4/426, 21 pages.

* cited by examiner

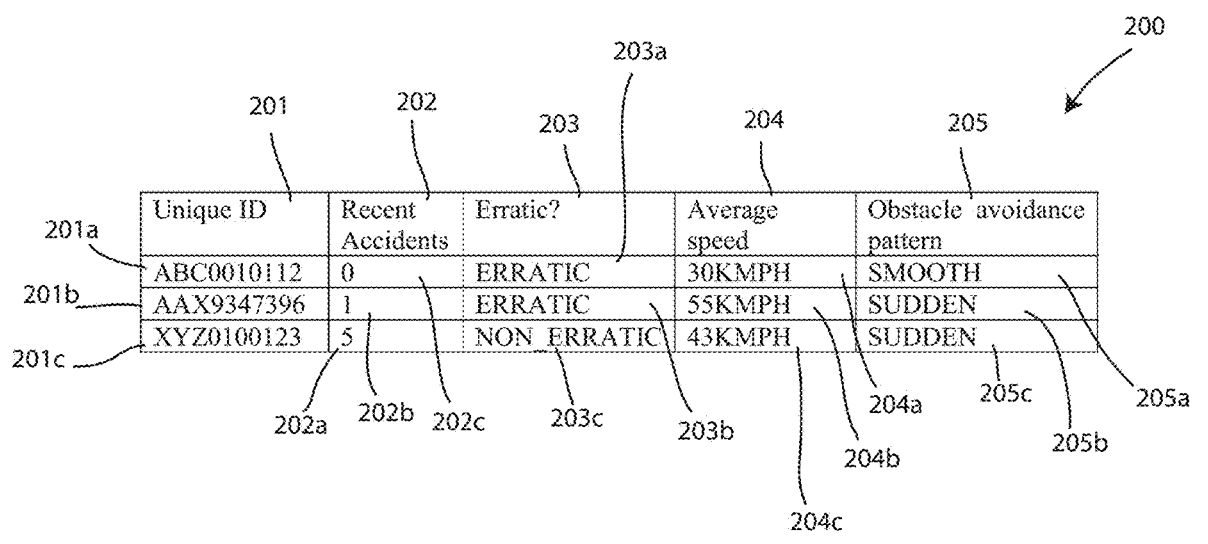

| Unique ID | Recent Accidents | Erratic? | Average speed | Obstacle avoidance pattern |
|---|---|---|---|---|
| ABC0010112 | 0 | ERRATIC | 30KMPH | SMOOTH |
| AAX9347396 | 1 | ERRATIC | 55KMPH | SUDDEN |
| XYZ0100123 | 5 | NON_ERRATIC | 43KMPH | SUDDEN |

FIG. 4

COGNITION ENABLED DRIVING PATTERN DETECTION

TECHNICAL FIELD

The present invention relates to systems and methods for self-driving vehicles. More specifically, the invention relates to systems and methods for cognition enabled driving pattern detection.

BACKGROUND

Vehicle motor systems are growing each day and becoming more intelligent with the integration of the latest technology. The automation for self-driving vehicles is increasing and adapting to newer technologies. In self-driving vehicles, various sensors are installed that sense desired external environment information and provide it to a vehicle control system. For example, self-driving vehicle may be outfitted with a GPS unit, an inertial navigation system, and other sensors including laser rangefinders, radar, and video. Self-driving vehicles use positional information from the GPS unit and the inertial navigation system to localize itself and the data from the sensors to refine its position estimate. Vehicle control systems for self-driving vehicles use this information to build a three-dimensional image of the environment. However, these environmental images do not provide a fully cognitive and comprehensive understanding of a driver's situation that learns from historical information acquired.

SUMMARY

An embodiment of the present invention relates to a method, and associated computer system and computer program product, for cognition enabled driving pattern detection. One or more processors of a computer system receive driving related data. The one or more processors of the computer system store the driving related data in one or more data repositories. The one or more processors of the computer system receive real-time driving data from at least one sensor related to an active driving situation. The one or more processors of the computer system analyze the driving related data and the real-time driving data. The one or more processors of the computer system detect a predictive driving outcome prior to the occurrence of the predictive driving outcome based on the analyzing. The one or more processors of the computer system notify a driver based on the predictive driving outcome.

BRIEF DESCRIPTION OF THE DRAWINGS

FIG. 4 depicts an exemplary database containing information gathered by the system of detection and information gathering of FIG. 3, in accordance with embodiments of the present invention.

DETAILED DESCRIPTION

Self-driving vehicles do not presently include any consideration of historical patterns of nearby vehicles. Additionally, self-driving vehicles do not use cognition in providing information to drivers. Still further, self-driving vehicles are unable to accurately and naturally provide information to drivers. Therefore, improved cognition enabled driving pattern detection and/or notification systems and methods would be well received in the art. Provided herein is a cognitive system that is capable of detecting driving patterns in real-time situations, including neighboring vehicles, based on data or information acquired by the system in real-time, and using historical information collected prior to the real-time situation. For example, the provided is a way of detecting driving patterns of nearby drivers based on this past and present information. Further provided is a cognitive assistant that is capable of conversationally and/or using natural language providing information, suggestions, or the like, to the driver in a real-time driving situation. This cognitive assistant may take the form as a driving companion. The detection and notification systems herein may take inputs, information, or data from various resources described herein in order to make predictions and provide information to a driver using, for example, the cognitive assistant. The methods and systems described herein further considers time, situation, location, and/or other peripheral components while providing notifications and/or suggestions to the driver. The methods and systems described herein further interpret the various inputs, data and/or information from both static and dynamic platforms, sensors, or the like.

Figure 1:
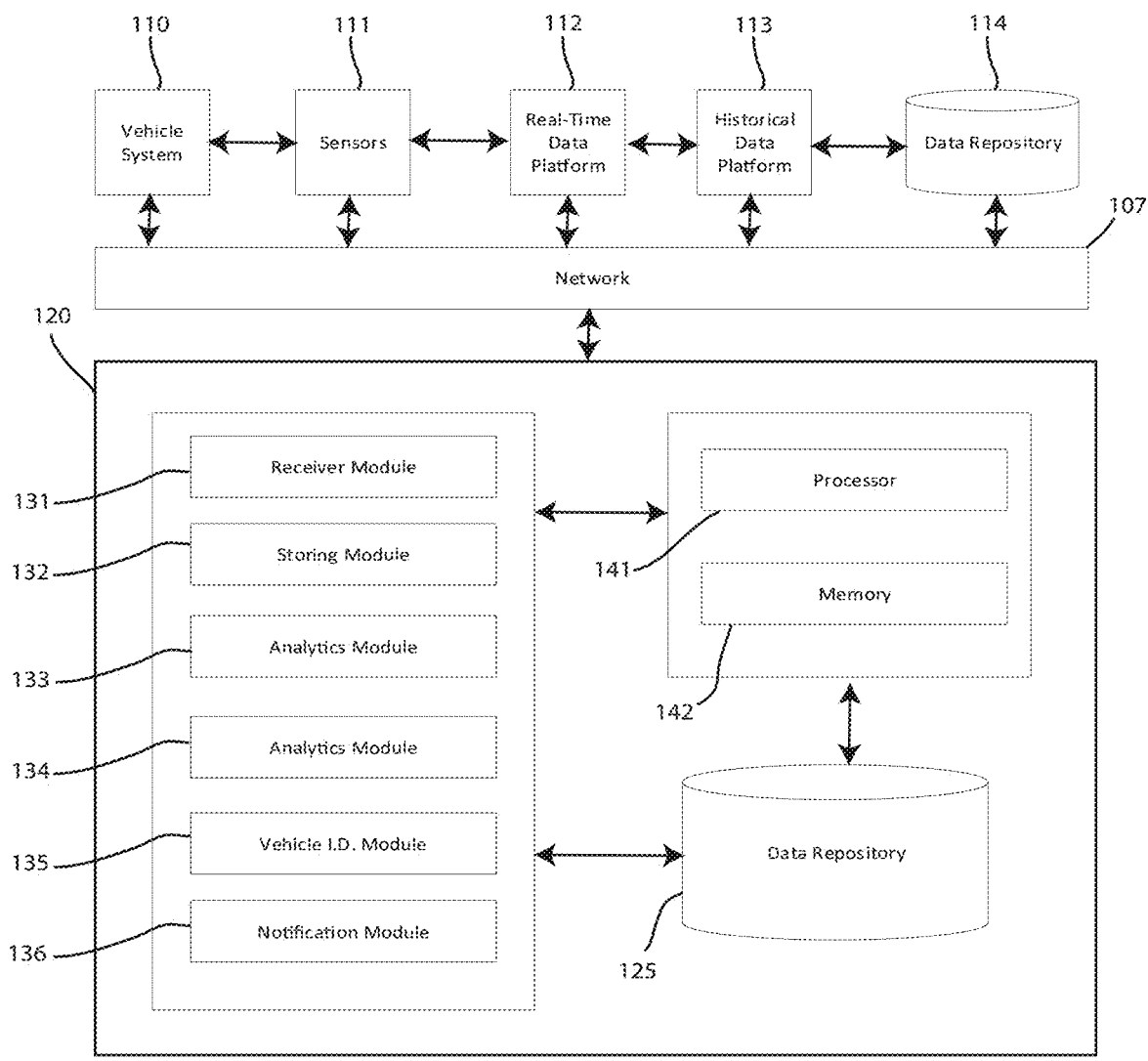
FIG. 1 depicts a block diagram of a cognition enabled driving pattern detection system, in accordance with embodiments of the present invention.

FIG. 1 depicts a block diagram of a cognition enabled driving pattern detection system 100, in accordance with embodiments of the present invention. Embodiments of the cognition enabled driving pattern detection system 100 may be a system for detecting driving patterns, detecting driving situations, analyzing driving situations and driving information and/or data, and providing driving notifications, conducted by a computer system 120. Embodiments of the computing system 120 may be a computer system, a computer, a server, one or more servers, a cloud computing device, a hardware device, a remote server, and the like. The cognition enabled driving pattern detection system 100 and/or computer system 120 may configured to consider historical patterns of driving conditions, including those related to nearby vehicles. The cognition enabled driving pattern detection system 100 and/or computer system 120 may configured to provide information or otherwise notify drivers. Thus, the cognition enabled driving pattern detection system 100 and/or computer system 120 may be configured to detect driving patterns using learning and cognition based on information accumulated, received or otherwise acquired from various information sources, sensors, databases and the like.

Furthermore, embodiments of the cognition enabled driving pattern detection system 100 may include one or more vehicle systems 110, one or more sensors 111, one or more real-time data platforms 112, one or more historical data platforms 113, and one or more data repositories 114 communicatively coupled to the computing system 120 of the cognition enabled driving pattern detection system 100 over a network 107. For instance, information/data related to driving patterns and the like may be transmitted to and received from the one or more vehicle systems 110, one or more sensors 111, one or more real-time data platforms 112, one or more historical data platforms 113, the one or more data repositories 114, and the computer system 120 over the network 107.

The network 107 may be a 4G, 5G and/or LTE based cellular data network or system. The network 107 may be a cloud network or system. Further embodiments of network 107 may refer to a group of two or more computer systems linked together. Network 107 may be any type of computer network known by individuals skilled in the art. Examples of computer networks 107 may include a LAN, WAN, campus area networks (CAN), home area networks (HAN), metropolitan area networks (MAN), an enterprise network, cloud computing network (either physical or virtual) e.g. the Internet, a cellular communication network such as GSM or CDMA or a mobile communications data network. The architecture of the computer network 107 may be a peer-to-peer network in some embodiments, wherein in other embodiments, the network 107 may be organized as a client/server architecture.

In some embodiments, the network 107 may further comprise, in addition to the computing system 120, a connection to the one or more network-accessible repositories 114, knowledge bases or the like containing driving pattern related data. The one or more network-accessible repositories 114 may include environmental condition data, proximate environment data, real-time location data, proximate vehicle data, map data. The one or more historical data platforms 113 may be configured to acquire this data that is stored by the one or more network repositories 114. The one or more network-accessible repositories 114 may further include information related to other systems connected to the network 107 that may be considered nodes of the network 107. In some embodiments, for example where the computing system 120 or network repositories allocate resources to be used by the other nodes of the network 107, the computing system 120 and network repository 114 may be servers.

The one or more network-accessible repositories 114 may be a data collection area on the network 107 which may back up and save all the data transmitted back and forth between the nodes of the network 107. For example, the one or more network-accessible repositories 114 may be a data center saving and cataloging environmental condition data, proximate environment data, real-time location data, proximate vehicle data, map data, and the like. In some embodiments, a data collection center housing the one or more network-accessible repositories 114 may include an analytic module capable of analyzing data being stored by the network repository 114. Further, the computing system 120 may be integrated with or as a part of the data collection center housing the network repository 114. In some alternative embodiments, the network repository 114 may be a local repository that is connected to the computing system 120.

Embodiments of the one or more vehicle systems 110 of the cognition enabled driving pattern detection system 100 may be any type vehicle such as a mot e, passenger car, van, bus, truck, SUV, or the like of any size. While the embodiment focused on in the present description will be road-based vehicles, the present methods and systems may be applicable to other vehicles such as airplanes, trains, helicopters, or other transportation systems. The one or more vehicles systems 110 may each include one or more computer control systems, peripheral actuators, mechanical systems, electrical systems, sensor systems, and the like. The one or more vehicle systems 110 may be connected to the computer system 120 of the cognition enabled driving pattern detection system 100 over the network 107. The one or more vehicle systems 110 may be configured to provide information gathered by the vehicle control systems to the computer system 120 and/or to the real-time and historical data platforms 112, 113 for storing and/or analysis.

Embodiments of the one or more sensors 111 may include information gathering tools for providing information and data to the repositories 114, 125 of the cognition enabled driving pattern detection system 100. The one or more sensors 111 may be environmental sensors configured to collect information about a driving environment. The one or more sensors 111 may be configured to provide real-time information to the computer system 120 and/or the one or more real time data platforms 112. The one or more sensors 111 may further be configured to provide information collected to the one or more historical data platforms 113. The one or more sensors 111 may be sensors located on a body of the vehicle, for example. In other embodiments, the one or more sensors 111 may be located within the cabin or internal portion of a vehicle. In still other embodiments, the one or more sensors 111 may be located in a static location within the environment, rather than being attached to a vehicle. For example, the one or more sensors 111 may be a GPS satellite system or video and/or picture capture devices set up proximate (over, under or on either side of) a road configured to gather pictures or video of the road. The one or more sensors 111 may be internet of things (IoT) devices that include or or more connectable information gathering sensors or devices. Wherever placed, the one or more sensors 111 may detect and/or collect data or information related to motion, sound, movement, light or the like.

Embodiments of the one or more real-time data platforms 112 of the cognition enabled driving pattern detection system 100 may be one or more systems configured to gather real-time information related to driving. For example, the one or more real-time data platforms 112 may integrate with some of the one or more sensors 111 and/or vehicle control systems of the one or more vehicle systems 110 to obtain real-time driving related information. The one or more real-time data platforms 112 may also be configured to obtain or gather real-time accident information, real-time traffic information (e.g. data related to how heavy the traffic is on a particular road or route), real-time weather information, and the like, and provide this information to the computer system 120. For example, the one or more real-time data platforms 112 may be regional transport system databases, weather databases or the like. The one or more real-time data platforms 112 may collect data related to the present driving conditions, and additionally may store information related to the time in which the data was received. The one or more real-time data platforms 112 may maintain an updated database that stores the latest information received related to driving conditions. The computer system 120 may utilize data collected or gathered by the one or more real-time data platforms 112 to detect patterns and make predictions and provide notifications to drivers. In other embodiments, the computer system 120 may be configured to gather, obtain and store real-time driving information directly, without needing to interface with the one or more real-time data platforms 112.

Embodiments of the one or more historical data platforms 113 of the cognition enabled driving pattern detection system 100 may be one or more systems configured to gather historical information related to driving. The one or more historical data platforms 113 may further be configured to store historical driving record information associated with individual drivers or individual vehicles. For example, the one or more historical data platforms 113 may store accident histories or driving infraction records associated with individual drivers and/or vehicles. For example, the one or more historical data platforms 112 may be regional transport system databases, weather databases or the like. Still further, the one or more real-time data platforms 112 may integrate with some of the one or more sensors 111 and/or the one or more vehicle systems 110 to obtain real-time driving related information. This real-time information gathering may be stored in the one or more historical data platforms 113 with time stamp information so that this data is retained so that the data can be utilized by the computer system 120 for predictive analysis. This sensor gathered information stored by the historical data platform 113 may be stored in a database that associates this gathered information with a particular individual driver, vehicle, road, location, or the like. The computer system 120 may utilize data collected or gathered by the one or more historical data platforms 113 to detect patterns and make predictions and provide notifications to drivers. In other embodiments, the computer system 120 may be configured to gather, obtain and store historical driving information directly, without needing to interface with the one or more historical data platforms 112.

Further, embodiments of the computing system 120 may be equipped with a memory device 142 which may store various data/information/code, and a processor 141 for implementing the tasks associated with the cognition enabled driving pattern detection system 100. In some embodiments, a cognition enabled driving pattern detection application 130 may be loaded in the memory 142 of the computing system 120. The computing system 120 may further include an operating system, which can be a computer program for controlling an operation of the computing system 120, wherein applications loaded onto the computing system 120 may run on top of the operating system to provide various functions. Furthermore, embodiments of computing system 120 may include the cognition enabled driving pattern detection application 130. Embodiments of the cognition enabled driving pattern detection application 130 may be an interface, an application, a program, a module, or a combination of modules. In an exemplary embodiment, the cognition enabled driving pattern detection application 130 may be a software application running on one or more back end servers, servicing multiple computing devices.

The cognition enabled driving pattern detection application 130 of the computing system 120 may include a receiving module 131, a storing module 132, an analytics module 133, a detection module 134, a vehicle identification module 135, and a notification module 136. A "module" may refer to a hardware-based module, software-based module or a module may be a combination of hardware and software. Embodiments of hardware-based modules may include self-contained components such as chipsets, specialized circuitry and one or more memory devices, while a software-based module may be part of a program code or linked to the program code containing specific programmed instructions, which may be loaded in the memory device of the computing system 120. A module (whether hardware, software, or a combination thereof may be designed to implement or execute one or more particular functions or routines.

Embodiments of the receiving module 131 may include one or more components of hardware and/or software program code for receiving information from the one or more vehicle systems 110, the one or more sensors 111, the one or more real-time data platforms 112, the one or more historical data platforms 113 and the data repositories 114. The receiving module 131 may be configured to receive this data and/or information and process this information by providing it to the storing module 132 for storing, or the analytics module 133 if the data is determined to be needed immediately for real-time analysis. The receiving module 131 may be configured to receive information through a 5G/LTE based network and data collection environment. Still further, the receiving module 131 may be configured to receive inquiries from a driver that is connected to the cognition enabled driving pattern detection system 100.

Embodiments of the storing module 132 may include one or more components of hardware and/or software program code for storing the information received by the one or more vehicle systems 110, the one or more sensors 111, the one or more real-time data platforms 112, the one or more historical data platforms 113 in the data repository 125 of the computer system 120. The storing module 132 may be configured to help determine whether data received by the receiving module 131 should be stored. This determining may include determining that the data is not needed by the analytics module 133 immediately and may be stored for future use by the analytics module 133. The storing module 132 may be configured to store all received data in the data repository 125 in some embodiments.

Embodiments of the analytics module 133 may include one or more components of hardware and/or software program code for analyzing the driving related data received by the receiving module 131 and/or stored by the storing module 132. The analytics module 133 may be configured to use data related to considerations such as time, situation, occasion, nature of potential upcoming obstacles, and historically successful approaches to overcoming driving obstacles such as traffic conditions, weather, accidents, neighboring driving behavior, and the like. The analytics module 133 may further be configured to analyze the nature and type of neighboring vehicles, along with the nature and type of the monitored vehicle (i.e. the vehicle that the computer system 120 notifies of detected patterns and provides driving suggestions to), such as whether the vehicle is an emergency vehicle, a law enforcement vehicle, a civilian passenger vehicle, a military vehicle, a commercial vehicle, a self-driving vehicle, a human driven vehicle and the like. The analytics module 133 may be configured to analyze data from regional transport system databases such as accident data, weather databases, or the like.

The analytics module 133 may be configured to consider data related to a driver's choice, habits and surrounding, and the behavior and/or patterns of neighboring drivers and/or vehicles. The analytics module 133 may be configured to consider data related to neighboring vehicles and/or drivers such as speed (current or average), driving patterns, GPS data to map the past course of a neighboring vehicle, age of the driver, personality of neighboring drivers, or the like. The analytics module 133 may be configured to consider erratic driving behavior or patterns of neighboring drivers. The analytics module 133 may further be configured to analyze and consider these same considerations of the monitored driver (i.e. the driver that the computer system 120 notifies of detected patterns and provides driving suggestions to). The analytics module 133 may be configured to consider the daily routine, calendar or the like of a monitored driver or neighboring driver.

Embodiments of the detection module 134 may include one or more components of hardware and/or software program code for making determinations of predictive driving outcomes prior to their occurrence based on the analysis from the analytics module 133. The detection module 134 may be configured to learn from history, update based on new information received, and the like. For example, the detection module 134 may be configured to detect and/or predict that a potential driving outcome is a dangerous driving situation. This may include analyzing with the analytics module 133 driving tendency data of a proximate driver and proximate vehicle data and determining that a dangerous driving situation is possible. The detection module 134 may be configured to determine best possible actions for a driver to take based on the analysis conducted by the analytics module 133. The detection module 134 may be configured to detect conditions whereby a particular type of vehicle is approaching the monitored driver. For example, the detection module 134 may be configured to determine that an emergency vehicle is approaching or nearby. The detection module 134 may be configured to determine that a better route exists, based on traffic or driving conditions. The detection module 134 may be configured to determine that particular drivers should be avoided or given ample space due to the particular driver's erratic driving, driving record, or the like. The detection module 134 may be configured to determine that an outcome might exist based on environmental considerations such as weather, time of year, calendar date, etc. For example, the detection module 134 may be configured to determine that bike riders may be common on a given road based on the time of year, time of day and/or weather conditions.

Embodiments of the vehicle identification module 135 may include one or more components of hardware and/or software program code for determining whether a vehicle is human-controlled or self-driven. The vehicle identification module 135 may be configured to analyze the driving behavior of a vehicle to make this determination without having a direct connection to the vehicle. The vehicle identification module 135 may be configured to analyze the non-erratic nature of a nearby vehicle, the driving speed, and driving tendencies. For example, the vehicle identification module may consider the distance from the next car, speed changes over time, braking tendency, and location of the vehicle within the lane. In some embodiments, the vehicle identification module 135 may be configured to determine the likeliness of a neighboring vehicle to be human-driven. For example, the vehicle identification module 135 may be configured to determine a high likelihood that a neighboring vehicle is human-driven. This determination may inform the various other modules 133, 134, 136 of possible detectable driving situations or outcomes.

Embodiments of the notification module 136 may include one or more components of hardware and/or software program code for notifying a monitored driver or vehicle of particular driving recommendations based on the analysis, detecting, and determining conducted by the various modules 133, 134, 135 as described herein above. The notification module 136 may be configured to provide verbal audible notifications to a driver using natural language based on the results of the analytics module 133 and/or the detection module 134 and/or the vehicle identification module 135. The notification module 136 may further be configured to provide answers to direct inquiries by a monitored driver received by the receiving module 131. For example, if the receiving module 131 receives a question by a driver of whether a given vehicle is self-driven or human driven, the notifying module 136 may be configured to provide this answer using natural language. Thus, the notification module 136 may be in communication with a hardware system of the vehicle system 110 that includes, for example, speakers, for providing audible sound. In other embodiments, the notification module 136 may be in communication with a mobile device carried by the user. The mobile device may include an application that integrates with the computer system 120 and provides information through the speaker of the mobile device from the notification module 136.

Exemplary notifications may include:

"Please move over for the car to the left of you because the driver is driving erratically."

"There is a fallen tree in the road ahead, please slow down."

"The driver to the right of you has a history of making sharp lane changes, please avoid staying next to them."

"The driver in front of you has a history of making very quickly, please keep a safe distance."

"An emergency vehicle is approaching from behind, please slow down and make way."

"It is a busy biking day on the road you are driving, please be careful of bikers."

The above are not meant to be limiting but provide some context to the type of natural language notifications contemplated herein and capable of being provided by the notification module 136.

The analytics module 133 and the detection module 134 may be configured to prioritize the analysis, detection, and notification, based on various factors such as time, situation, occasion, nature of driving obstacles, environmental conditions, nature of traffic and neighboring drivers, and the like.

Figure 2:
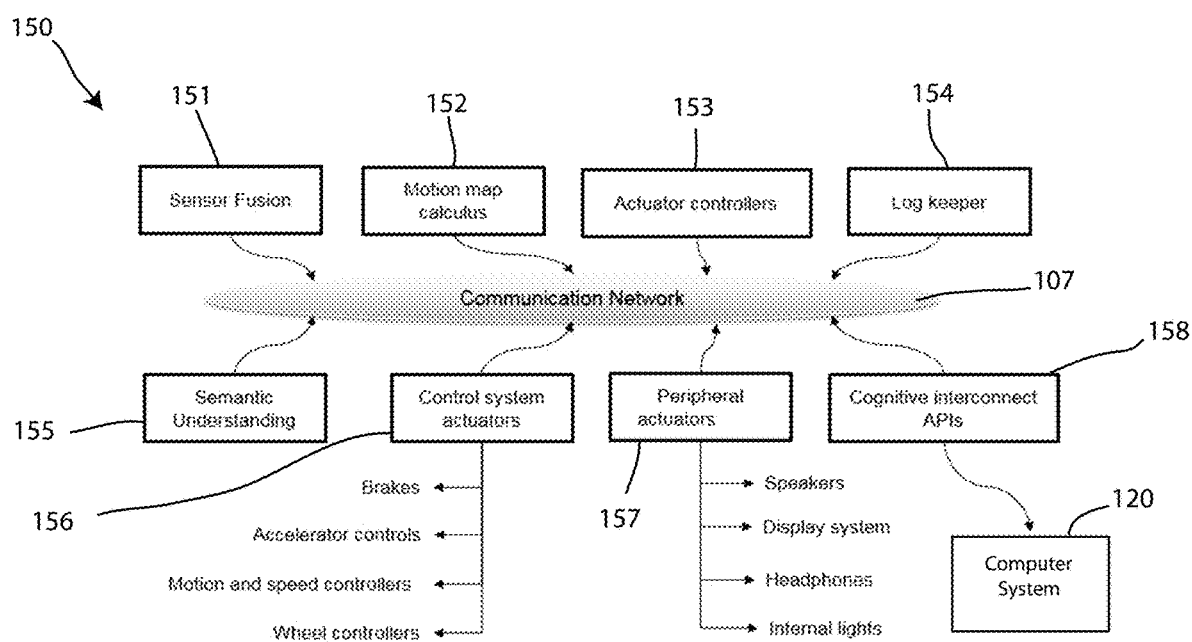
FIG. 2 depicts a block diagram of a vehicle control system of the cognition enabled driving pattern detection system of FIG. 1, in accordance with embodiments of the present invention.

FIG. 2 depicts a block diagram of a vehicle control system 150 of the cognition enabled driving pattern detection system 100, in accordance with embodiments of the present invention. The vehicle control system 150 is shown including various input and output sources connected over the communication network 107. The input and output sources shown include sensor fusion 151, motion map calculus 152, actuator controllers 153, a log keeper 154, semantic understanding 155, control system actuators 156, peripheral actuators 157, and Cognitive interconnect API's 158.

Figure 3:
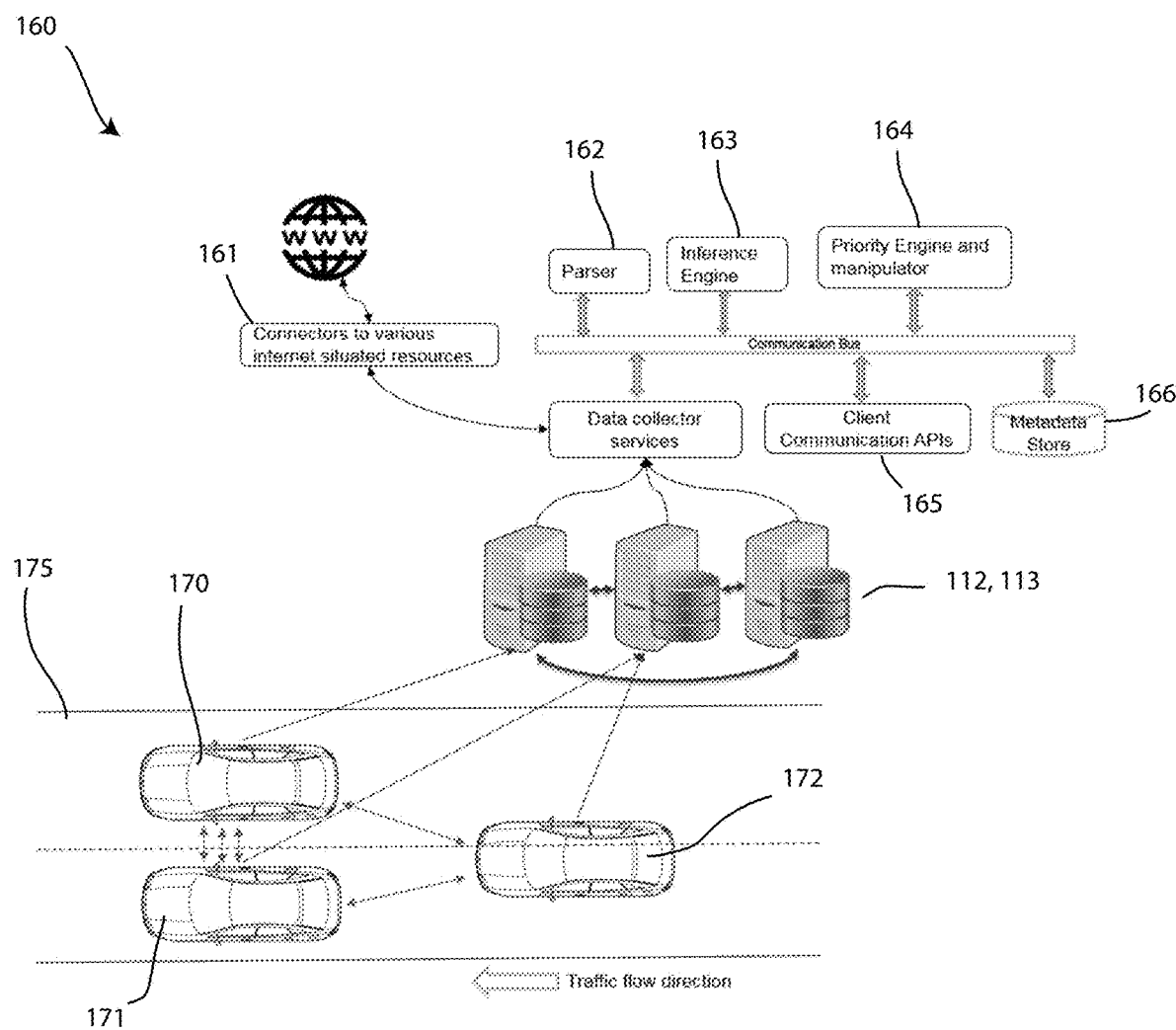
FIG. 3 depicts a block diagram of a system of detection and information gathering using the cognition enabled driving pattern detection system of FIG. 1, in accordance with embodiments of the present invention.

FIG. 3 depicts a block diagram of a system of detection and information gathering 160 using the cognition enabled driving pattern detection system 100, in accordance with embodiments of the present invention. The system of detection and information gathering 160 may include data collector services, such as the real-time data platform 112 and the historical data platform 113 connected to various internet situation resources 161. The data collector services 112, 113 may be connected with a communications bus to a parser 162, an inference engine 163, a priority engine and manipulator 164, client communication API's 165 and metadata stores 166. The system of detection and information gathering 160 and the platforms 112, 113 may be connected, such as by a 4G, 5G or LTE network, to sensor information coming from various vehicles 170, 171, 172 driving on a road 175 having two lanes. As shown the vehicle systems 170, 171, 172 may further be in communication with each other in order to send and receive data obtained through vehicle sensing systems directly.

FIG. 4 depicts an exemplary database 200 containing information gathered by the system of detection and information gathering 160 and/or the cognition enabled driving pattern detection system 100, in accordance with embodiments of the present invention. The database 200 may include a column 201 that stores Unique ID information, such as the cells 201a, 201b, and 201c. The Unique ID information may relate to one or both of a vehicle and a driver. The database 200 may include a column 202 that stores recent accident information associated with each of the individual Unique ID's, such as the cells 202a, 202b, and 202c. For example, the column 202 may keep track of the number of reported accidents associated with the vehicle or driver that corresponds to the Unique ID. The database 200 may include a column 203 that stores erratic behavior information, such as the cells 203a, 203b, and 203c. For example, the column 202 may determine if a driver has recently driven erratically or not. This information may be updated each time the driver and/or vehicle associated with the Unique ID enters a new driving experience. Alternatively, a column may store information related to historic erratic behavior from past driving experiences. The database 200 may include a column 204 that stores average speed information, such as the cells 204a, 204b, and 204c. This information may be updated each time the driver and/or vehicle associated with the Unique ID enters a new driving experience, or even a new roadway, highway route or the like. Alternatively, a column may store information related to historic average speeds from past driving experiences. The database 200 may include a column 205 that stores obstacle avoidance pattern information, such as the cells 205a, 205b, and 205c. This information may be updated each time the driver and/or vehicle associated with the Unique ID enters a new driving experience. Alternatively, a column may store information related to historic avoidance obstacle behavior from past driving experiences.

Figure 5:
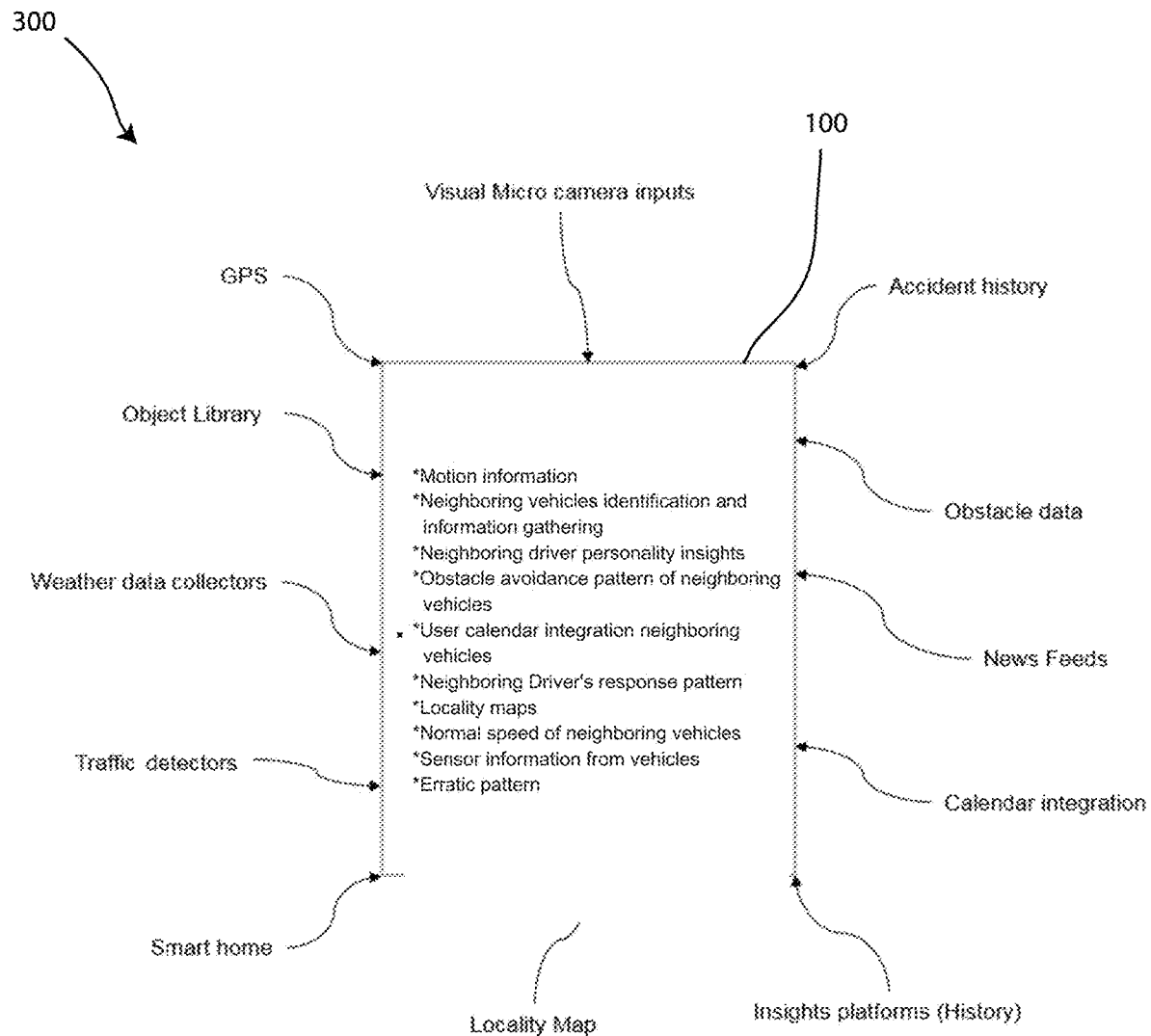
FIG. 5 depicts a block diagram of information resources utilized by the cognition enabled driving pattern detection system of FIG. 1, in accordance with embodiments of the present invention.

FIG. 5 depicts a block diagram 300 of information resources utilized by the cognition enabled driving pattern detection system 100, in accordance with embodiments of the present invention. As shown the cognition enabled driving pattern detection system 100 may be configured to receive information from GPS systems, object libraries, weather data collectors, traffic detectors, smart home systems, locality map systems, insights platforms containing historical information, calendar systems, news feed systems, obstacle tracking systems, accident history systems and visual micro camera sensor systems. The cognition enabled driving pattern detection system 100 may be configured to store information received from these various information sources in databases related to motion information, neighboring vehicles identification and information gathering, neighboring vehicle personality insights, obstacle avoidance patterns related to neighboring vehicles, user calendar integration of neighboring vehicles, neighboring vehicle driver response patterns, location maps, speed information of neighboring vehicles, sensor information from vehicles, and erratic driving information related to neighboring vehicles. It should be understood that these information gathering sources and storage databases are not exhaustive and the cognition enabled driving pattern detection system 100 may use any available data that would be relevant to predicting driving outcomes and situations.

Figure 6:
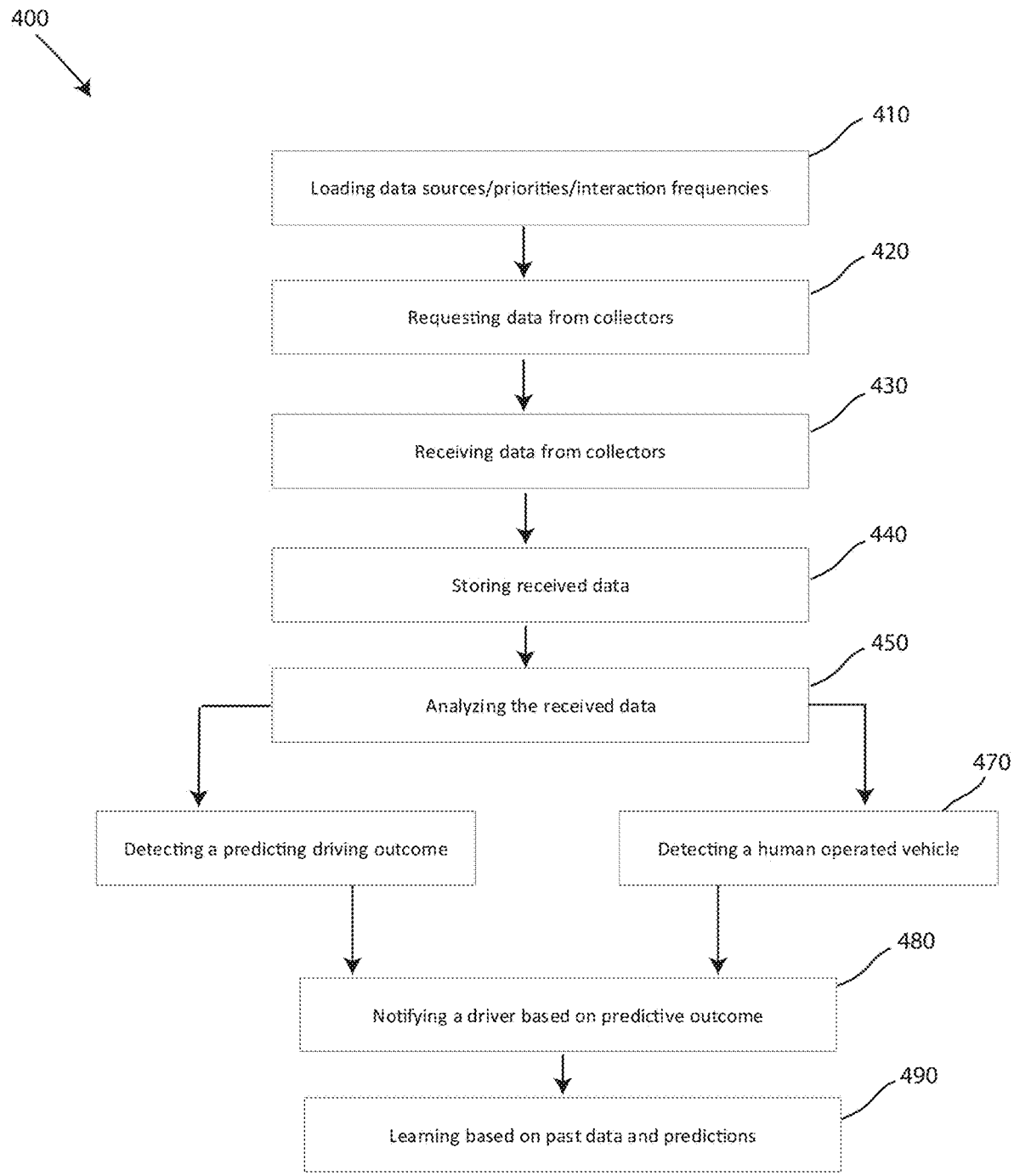
FIG. 6 depicts a method for cognition enabled driving pattern detection and notification, in accordance with embodiments of the present invention.

FIG. 6 depicts a method for cognition enabled driving pattern detection and notification 400, in accordance with embodiments of the present invention. The method 400 may include a step 410 of loading, by a computer system such as the computer system 120, data sources, priorities and/or interaction frequency information into an application, such as the application 130. These interaction frequencies may govern the frequency by which driving related data is collected, or requested to be collected from various data collectors that are collecting the driving related data, such as the one or more vehicle systems 110, the one or more sensors 111, the one or more real-time data platforms 112, and the one or more historical data platforms 113. The method 400 may include a step 420 of requesting the driving related data from the various data collectors 110, 111, 112, 113. The method 400 may include a step 430 of receiving the requested driving related data from the various data collectors, such as by the receiving module 131 of the application 130. The received data may relate to either or both a real time driving situation of may relate to general driving related data, such as historic driving related data. The method 400 may include a step 440 of storing the received driving related data, such as by the storing module 132. The method 400 may include a step 450 of analyzing the received driving related data, such as by the analytic module 133. The method 400 may include a step 460 of detecting a predictive driving outcome prior to the occurrence of the outcome based on the analyzing step 450. The method may also include a step 470 of detecting or identifying that a proximate vehicle to the driver is human-controlled using the received driving related data. After steps 460 and/or 470, the method 400 may include a step 480 of notifying the driver based on the predictive outcome of the predictive outcome. This notifying may be an audible notification provided using plain or natural language through a speaker system in a vehicle or mobile device operated by the driver. The method 400 may include an additional step 490 of cognitively learning based on past or historical data and past or historical predictions, and updating the analyzing based on newly gathered information. The method 400 may include updating the analytical models based on the newly gathered data or information.

Figure 7:
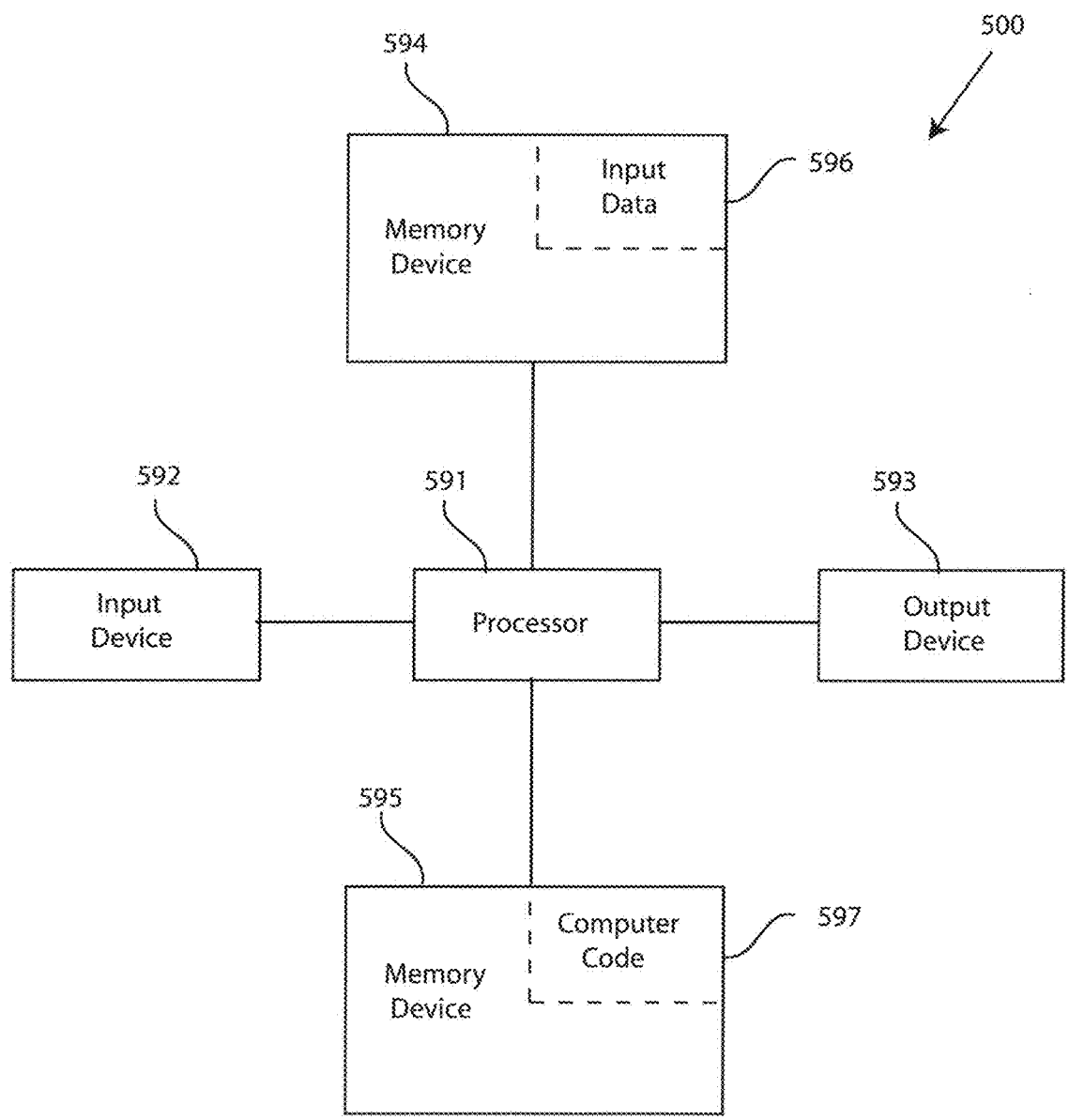
FIG. 7 depicts a block diagram of an exemplary computer system that may be included in the cognition enabled driving pattern detection system of FIG. 1, the vehicle control system of FIG. 1, and/or the system of detecting and information gathering of FIG. 3, capable of implementing methods for cognition enabled driving pattern detection and notification of FIG. 6, in accordance with embodiments of the present invention.

FIG. 7 depicts a block diagram of an exemplary computer system that may be included in the cognition enabled driving pattern detection systems of FIGS. 1-3, capable of implementing methods for cognition enabled driving pattern detection of FIG. 5, in accordance with embodiments of the present invention. The computer system 500 may generally comprise a processor 591, an input device 592 coupled to the processor 591, an output device 593 coupled to the processor 591, and memory devices 594 and 595 each coupled to the processor 591. The input device 592, output device 593 and memory devices 594, 595 may each be coupled to the processor 591 via a bus. Processor 591 may perform computations and control the functions of computer 500, including executing instructions included in the computer code 597 for the tools and programs capable of implementing a method for cognition enabled driving pattern detection in the manner prescribed by the embodiment of FIG. 5 using one, some or all of the systems of FIGS. 1-3, wherein the instructions of the computer code 597 may be executed by processor 591 via memory device 595. The computer code 597 may include software or program instructions that may implement one or more algorithms for implementing the methods for cognition enabled driving pattern detection, as described in detail above. The processor 591 executes the computer code 597. Processor 591 may include a single processing unit, or may be distributed across one or more processing units in one or more locations (e.g., on a client and server).

The memory device 594 may include input data 596. The input data 596 includes any inputs required by the computer code 597. The output device 593 displays output from the computer code 597. Either or both memory devices 594 and 595 may be used as a computer usable storage medium (or program storage device) having a computer-readable program embodied therein and/or having other data stored therein, wherein the computer-readable program comprises the computer code 597. Generally, a computer program product (or, alternatively, an article of manufacture) of the computer system 500 may comprise said computer usable storage medium (or said program storage device).

Memory devices 594, 595 include any known computer-readable storage medium, including those described in detail below. In one embodiment, cache memory elements of memory devices 594, 595 may provide temporary storage of at least some program code (e.g., computer code 597) in order to reduce the number of times code must be retrieved from bulk storage while instructions of the computer code 597 are executed. Moreover, similar to processor 591, memory devices 594, 595 may reside at a single physical location, including one or more types of data storage, or be distributed across a plurality of physical systems in various forms. Further, memory devices 594, 595 can include data distributed across, for example, a local area network (LAN) or a wide area network (WAN). Further, memory devices 594, 595 may include an operating system (not shown) and may include other systems not shown in FIG. 7.

In some embodiments, the computer system 500 may further be coupled to an Input/output (I/O) interface and a computer data storage unit. An I/O interface may include any system for exchanging information to or from an input device 592 or output device 593. The input device 592 may be, inter alia, a keyboard, a mouse, etc. or in some embodiments the touchscreen of a computing device. The output device 593 may be, inter alia, a printer, a plotter, a display device (such as a computer screen), a magnetic tape, a removable hard disk, a floppy disk, etc. The memory devices 594 and 595 may be, inter glia, a hard disk, a floppy disk, a magnetic tape, an optical storage such as a compact disc (CD) or a digital video disc (DVD), a dynamic random access memory (DRAM), a read-only memory (ROM), etc. The bus may provide a communication link between each of the components in computer 500, and may include any type of transmission link, including electrical, optical, wireless, etc.

An I/O interface may allow computer system 500 to store information (e.g., data or program instructions such as program code 597) on and retrieve the information from one or more computer data storage units (not shown). The one or more computer data storage units include a known computer-readable storage medium, which is described below. In one embodiment, the one or more computer data storage units may be a non-volatile data storage device, such as a magnetic disk drive (i.e., hard disk drive) or an optical disc drive (e.g., a CD-ROM drive which receives a CD-ROM disk). In other embodiments, the one or more computer data storage unit may include a knowledge base or data repository 125, such as shown in FIG. 1.

As will be appreciated by one skilled in the art, in a first embodiment, the present invention may be a method; in a second embodiment, the present invention may be a system; and in a third embodiment, the present invention may be a computer program product. Any of the components of the embodiments of the present invention can be deployed, managed, serviced, etc. by a service provider that offers to deploy or integrate computing infrastructure with respect to identification validation systems and methods. Thus, an embodiment of the present invention discloses a process for supporting computer infrastructure, where the process includes providing at least one support service for at least one of integrating, hosting, maintaining and deploying computer-readable code (e.g., program code 597) in a computer system (e.g., computer 500) including one or more processor(s) 591, wherein the processor(s) carry out instructions contained in the computer code 597 causing the computer system to perform the method cognition enabled driving pattern detection. Another embodiment discloses a process for supporting computer infrastructure, where the process includes integrating computer-readable program code into a computer system including a processor.

The step of integrating includes storing the program code in a computer-readable storage device of the computer system through use of the processor. The program code, upon being executed by the processor, implements a method for cognition enabled driving pattern detection. Thus, the present invention discloses a process for supporting, deploying and/or integrating computer infrastructure, integrating, hosting, maintaining, and deploying computer-readable code into the computer system 500, wherein the code in combination with the computer system 700 is capable of performing a method for cognition enabled driving pattern detection.

A computer program product of the present invention comprises one or more computer-readable hardware storage devices having computer-readable program code stored therein, said program code containing instructions executable by one or more processors of a computer system to implement the methods of the present invention.

A computer system of the present invention comprises one or more processors, one or more memories, and one or more computer-readable hardware storage devices, said one or more hardware storage devices containing program code executable by the one or more processors via the one or more memories to implement the methods of the present invention.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly release to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
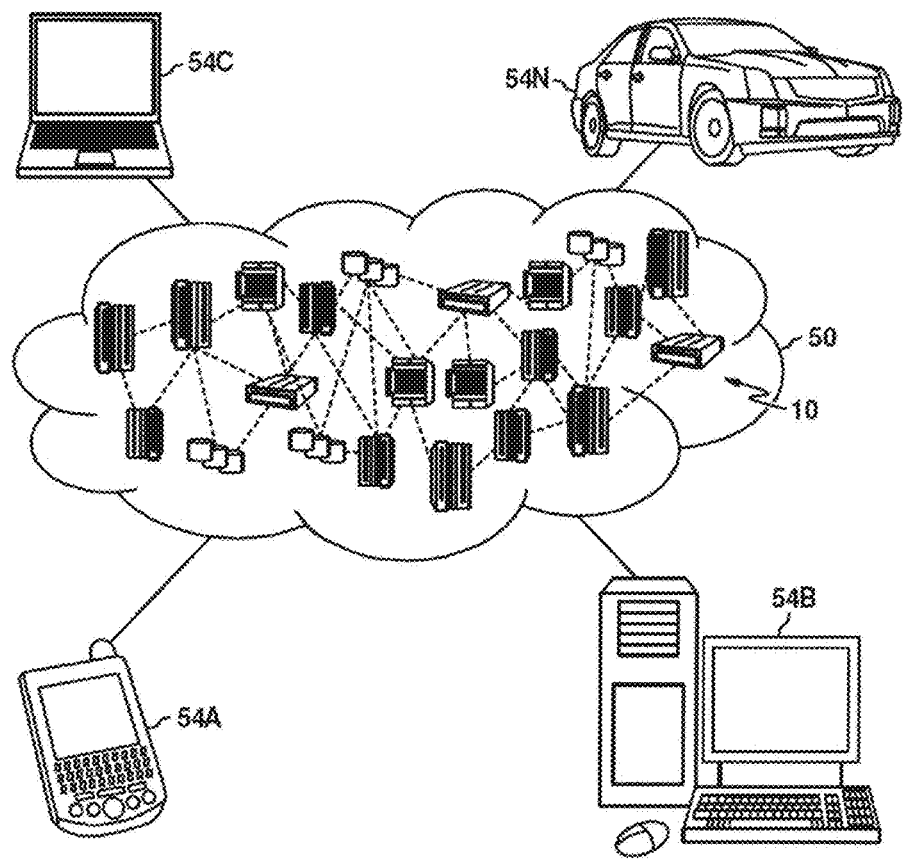
FIG. 8 depicts a cloud computing environment, in accordance with embodiments of the present invention.

Referring now to FIG. 8, illustrative cloud computing environment 50 is depicted. As shown, cloud computing environment 50 includes one or more cloud computing nodes 10 with which local computing devices used by cloud consumers or users, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 7 are intended to be illustrative only and that computing nodes 10 and cloud computing environment 50 can communicate with any type of computerized device over any type of network and/or network addressable connection (e.g., using a web browser).

Figure 9:
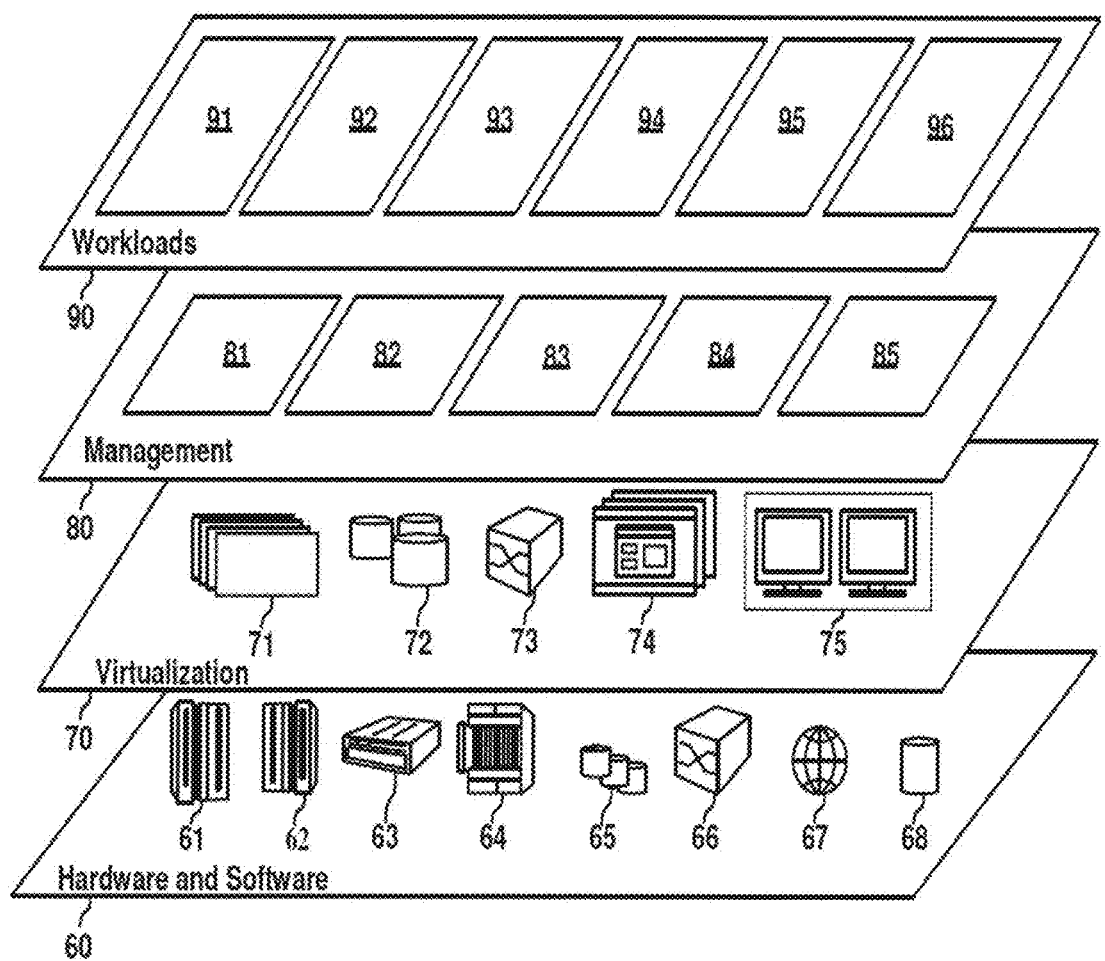
FIG. 9 depicts abstraction model layers, in accordance with embodiments of the present invention.

Referring now to FIG. 9, a set of functional abstraction layers provided by cloud computing environment 50 (see FIG. 8) are shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized.

Examples of workloads and functions which may be provided from this layer include: mapping and navigation 91; software development and lifecycle management 92; virtual classroom education delivery 93; data analytics processing 94; transaction processing 95; and cognition enabled driving pattern detection and/or notification 96.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein

What is claimed is:

1. A method for cognition enabled driving pattern detection, the method comprising:
   receiving, by one or more processors of a computer system, historical driving related data, wherein the computer system includes one or more servers, wherein the historical driving related data includes data selected from the group consisting of calendar data, location data, weather data, historical data, accident data, driving tendency data, and combinations thereof;
   storing, by the one or more processors of the computer system, the historical driving related data in one or more data repositories;
   receiving, by the one or more processors of the computer system, real-time driving data from at least one sensor related to an immediate and external real-time driving situation, wherein the real-time driving data from the at least one sensor is received over a network;
   analyzing, by the one or more processors of the computer system, the historical driving related data and the real-time driving data, wherein the analyzing the historical driving related data and the real-time driving related data includes analyzing a historical driving record associated with individual drivers or individual vehicles;
   detecting, by the one or more processors of the computer system, a predictive driving outcome prior to the occurrence of the predictive driving outcome of the immediate and external real-time driving situation based on the analyzing; and
   notifying, by the one or more processors of the computer system, a driver based on the predictive driving outcome.

2. The method of claim 1, wherein the real-time driving data from the at least one sensor is received over a cellular network.

3. The method of claim 1, wherein the real-time driving data includes data selected from the group consisting of environmental condition data, proximate environment data, real-time location data, proximate vehicle data, map data, and combinations thereof.

4. The method of claim 1, wherein the driving related data includes driving tendency data and wherein the real-time driving data includes proximate vehicle data, and wherein the predictive driving outcome is an immediate dangerous driving situation, and wherein the analyzing includes analyzing driving tendency data of a proximate driver and analyzing the proximate vehicle data and determining that the immediate dangerous driving situation is possible and further determining a driving recommendation, wherein the notification includes providing the driving recommendation to the driver.

5. The method of claim 1, wherein the notifying includes providing a verbal audible notification to the driver using natural language.

6. The method of claim 1, further comprising identifying, by the one or more processors of the computer system, that a proximate vehicle to the driver is a human-controlled vehicle using the driving related data and the real-time driving data.

7. A computer system, comprising:
   one or more processors;
   one or more memory devices coupled to the one or more processors; and
   one or more computer readable storage devices coupled to the one or more processors, wherein the one or more storage devices contain program code executable by the one or more processors via the one or more memory devices to implement a method for cognition enabled driving pattern detection, the method comprising:
   receiving, by the one or more processors of a computer system, historical driving related data, wherein the computer system includes one or more servers, wherein the historical driving related data includes data selected from the group consisting of calendar data, location data, weather data, historical data, accident data, driving tendency data, and combinations thereof;
   storing, by the one or more processors of the computer system, the historical driving related data in one or more data repositories;
   receiving, by the one or more processors of the computer system, real-time driving data from at least one sensor related to an immediate and external real-time driving situation, wherein the real-time driving data from the at least one sensor is received over a network;
   analyzing, by the one or more processors of the computer system, the historical driving related data and the real-time driving data, wherein the analyzing the historical driving related data and the real-time driving related data includes analyzing a historical driving record associated with individual drivers or individual vehicles;
   detecting, by the one or more processors of the computer system, a predictive driving outcome prior to the occurrence of the predictive driving outcome of the immediate and external real-time driving situation based on the analyzing; and
   notifying, by the one or more processors of the computer system, a driver based on the predictive driving outcome.

8. The computer system of claim 7, wherein the real-time driving data from the at least one sensor is received over a cellular network.

9. The computer system of claim 7, wherein the real-time driving data includes data selected from the group consisting of environmental condition data, proximate environment data, real-time location data, proximate vehicle data, map data, and combinations thereof.

10. The computer system of claim 7, wherein the driving related data includes driving tendency data and wherein the real-time driving data includes proximate vehicle data, and wherein the predictive driving outcome is an immediate dangerous driving situation, and wherein the analyzing includes analyzing driving tendency data of a proximate driver and analyzing the proximate vehicle data and determining that the immediate dangerous driving situation is possible and further determining a driving recommendation, wherein the notification includes providing the driving recommendation to the driver.

11. The computer system of claim 7, wherein the notifying includes providing a verbal audible notification to the driver using natural language.

12. The computer system of claim 7, further comprising identifying, by the one or more processors of the computer system, that a proximate vehicle to the driver is a human-controlled vehicle using the driving related data and the real-time driving data.

13. A computer program product, comprising one or more computer readable hardware storage devices storing a computer readable program code, the computer readable program code comprising an algorithm that when executed by one or more processors of a computing system implements a method for cognition enabled driving pattern detection, the method comprising:
  receiving, by the one or more processors of a computer system, historical driving related data, wherein the computer system includes one or more servers and, wherein the historical driving related data includes data selected from the group consisting of calendar data, location data, weather data, historical data, accident data, driving tendency data, and combinations thereof;
  storing, by the one or more processors of the computer system, the historical driving related data in one or more data repositories;
  receiving, by the one or more processors of the computer system, real-time driving data from at least one sensor related to an immediate and external real-time driving situation, wherein the real-time driving data from the at least one sensor is received over a network;
  analyzing, by the one or more processors of the computer system, the historical driving related data and the real-time driving data, wherein the analyzing the historical driving related data and the real-time driving related data includes analyzing a historical driving record associated with individual drivers or individual vehicles;
  detecting, by the one or more processors of the computer system, a predictive driving outcome prior to the occurrence of the predictive driving outcome of the immediate and external real-time driving situation based on the analyzing; and
  notifying, by the one or more processors of the computer system, a driver based on the predictive driving outcome.

14. The computer program product of claim 13, wherein the driving related data includes data selected from the group consisting of calendar data, location data, weather data, historical data, accident data, driving tendency data, and combinations thereof.

15. The computer program product of claim 13, wherein the driving related data includes driving tendency data and wherein the real-time driving data includes proximate vehicle data, and wherein the predictive driving outcome is an immediate dangerous driving situation, and wherein the analyzing includes analyzing driving tendency data of a proximate driver and analyzing the proximate vehicle data and determining that the immediate dangerous driving situation is possible and further determining a driving recommendation, wherein the notification includes providing the driving recommendation to the driver.

16. The computer program product of claim 13, wherein the notifying includes providing a verbal audible notification to the driver using natural language.

17. The computer program product of claim 13, further comprising identifying, by the one or more processors of the computer system, that a proximate vehicle to the driver is a human-controlled vehicle using the driving related data and the real-time driving data.

\* \* \* \* \*